United States Patent
Chen et al.

(10) Patent No.: US 10,587,474 B2
(45) Date of Patent: Mar. 10, 2020

(54) ELASTIC CAPACITY MANAGEMENT WITH A CLOUD CABLE MODEM TERMINATION SYSTEM (CCMTS)

(71) Applicant: Cisco Technology, Inc., San Jose, CA (US)

(72) Inventors: YuLing Chen, Fremont, CA (US); Tung-Fai Chan, Palo Alto, CA (US); Alon Shlomo Bernstein, Monte Sereno, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/823,953

(22) Filed: Nov. 28, 2017

(65) Prior Publication Data
US 2019/0166002 A1    May 30, 2019

(51) Int. Cl.
*H04L 12/24*       (2006.01)
*H04L 29/08*       (2006.01)

(52) U.S. Cl.
CPC ...... *H04L 41/0896* (2013.01); *H04L 41/0806* (2013.01); *H04L 69/323* (2013.01)

(58) Field of Classification Search
None
See application file for complete search history.

(56) References Cited

U.S. PATENT DOCUMENTS

| | | | |
|---|---|---|---|
| 9,501,307 B2* | 11/2016 | Sudhir | G06F 9/45558 |
| 9,999,030 B2* | 6/2018 | Gu | H04W 72/0406 |
| 2014/0201374 A1 | 7/2014 | Ashwood-Smith et al. | |
| 2016/0328252 A1* | 11/2016 | Singh | G06F 9/455 |
| 2016/0337172 A1* | 11/2016 | Yu | H04L 12/6418 |
| 2017/0078216 A1 | 3/2017 | Adolph et al. | |
| 2018/0034778 A1* | 2/2018 | Ahuja | H04L 63/0254 |

* cited by examiner

*Primary Examiner* — Nicholas Sloms
(74) *Attorney, Agent, or Firm* — Merchant & Gould P.C.

(57) ABSTRACT

Elastic capacity management of remote physical layer (R-PHY) nodes with a cloud Cable Modem Termination System (cCMTS) may be provided. First, a cCMTS instance may be spawned by an orchestrator. Next, the cCMTS instance may be synchronized with states of a physical Cable Modem Termination System (pCMTS). Underlay routing may then be configured between a plurality of remote physical layer (R-PHY) nodes and the cCMTS instance. Then a plurality of R-PHY node connections respectively corresponding to the plurality of R-PHY nodes may be switched from the pCMTS to the cCMTS instance.

17 Claims, 3 Drawing Sheets

ELASTIC CAPACITY MANAGEMENT WITH A CLOUD CABLE MODEM TERMINATION SYSTEM (CCMTS)

TECHNICAL FIELD

The present disclosure relates generally to cloud cable modem termination system elasticity.

BACKGROUND

A Hybrid Fiber-Coaxial (HFC) network is a broadband network that combines optical fiber and coaxial cable. It has been commonly employed globally by cable television operators. In a hybrid fiber-coaxial cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
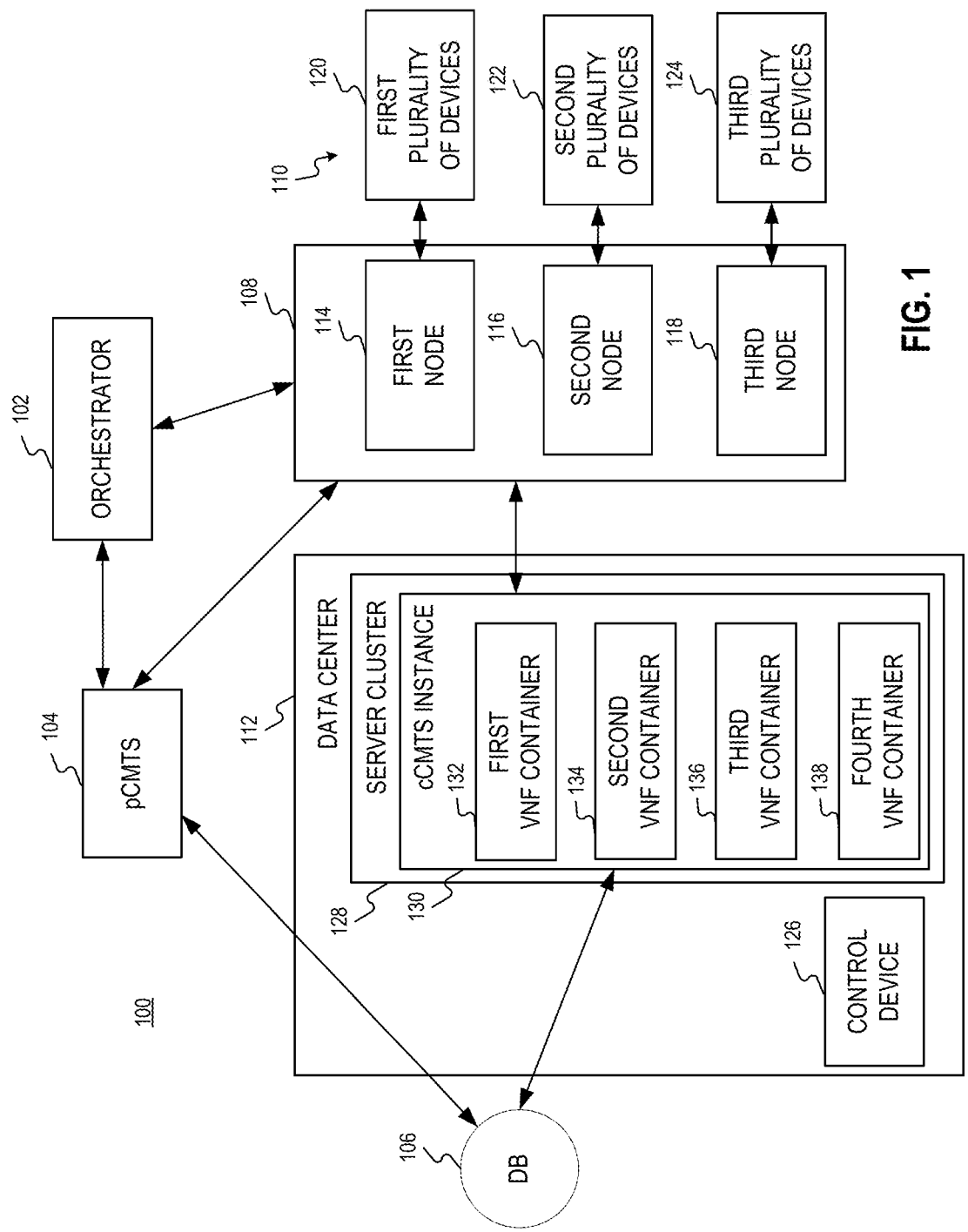
FIG. 1 is a block diagram of a system for providing elastic capacity management of remote physical layer (R-PHY) nodes with a cloud Cable Modem Termination System (cCMTS)

Elastic capacity management of remote physical layer (R-PHY) nodes with a cloud Cable Modem Termination System (cCMTS) may be provided. First, a cCMTS instance may be spawned by an orchestrator. Next, the cCMTS instance may be synchronized with states of a physical Cable Modem Termination System (pCMTS). Underlay routing may then be configured between a plurality of remote physical layer (R-PHY) nodes and the cCMTS instance. Then a plurality of R-PHY node connections respectively corresponding to the plurality of R-PHY nodes may be switched from the pCMTS to the cCMTS instance.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the-disclosed methods. Accordingly, the following detailed description does not limit the disclosure. Instead, the proper scope of the disclosure is defined by the appended claims.

When Remote Physical Layer (R-PHY) nodes are connected to a Physical Cable Modem Termination System (pCMTS) during R-PHY node bring-up time, a certain amount of Cable Modem Termination System (CMST) core resources are allocated to the corresponding R-PHY nodes. However, subscriber (e.g., user) traffic associated with the R-PHY nodes may change over time. For example, in some areas, network traffic may peak in the morning and drops down to a minimum at midnight, or the population of one geographical location may be expanded over the time. Accordingly, dynamically changing bandwidth capacity allocated to R-PHY nodes may be desired.

Embodiments of the disclosure may leverage dynamic scaling capabilities in a cloud Cable Modem Termination System (cCMTS) environment to satisfy CMTS (e.g., Converged Cable Access Platform (CCAP)) core resource capacity requirement changes from connected R-PHYs. Utilizing its traffic sensing capability at an edge of a network, R-PHYs may detect traffic utilization changes on R-PHY nodes and send a signal to an orchestrator to request CCAP core resource allocation changes. Upon taking requests from the R-PHYs regarding resource allocation changes (e.g., resource expansions or reductions), the orchestrator may make a decision as to when to kick off a resource allocation change process. When the resource allocation change process starts, embodiments of the disclosure may dynamically spawns new cCMTS instances to augment resources of existing pCMTS or cCMTS systems.

Embodiments of the disclosure may minimize the impact on subscriber (e.g., user) traffic during the resource allocation change process. This may help keep, for example, cable modems that are connected to the R-PHYs online during the resource allocation change process. To make the resource allocation change process seamless to subscribers, two separate dedicated subnets may keep data paths continuously flowing while an external database synchronization occurs between an existing CMTS and a newly spawned cCMTS instance. Before traffic switching occurs, the orchestrator may complete underlay routing configuration to prepare for a transition of subscriber traffic from existing CMTS systems to newly spawned cCMTS instances. This may apply to both capacity expansion and capacity reduction.

Embodiments of the disclosure may apply to both cCMTS environments and a mixed deployment environment with pCMTS and cCMTS instances. Consistent with embodiments of the disclosure, the orchestrator may automate an elastic capacity management of R-PHYs in a mixed pCMTS and cCMTS architecture. At the same time, R-PHYs at an edge of a cable network (e.g., an HFC network) may sense traffic bandwidth utilization changes on the R-PHYs. With a communication channel open between the R-PHY(s) and the orchestrator, the R-PHY(s) may send a signal to the orchestrator to request more CCAP core resources, for example, either directly or through the CMTS (i.e., CCAP) core. Upon receiving such requests from R-PHYs, the orchestrator may make a decision based on global resource allocation status and start the aforementioned resource allocation change process.

Consistent with embodiments of the disclosure, in large scale deployment scenarios for example, there may be hundreds of pCMTS devices where each of them may be connected to hundreds of R-PHY nodes. Although the orchestrator may directly monitor the R-PHY traffic utilization, embodiments of the disclosure utilizing R-PHY traffic sensing capability and sending resource allocation change requests to the orchestrator when needed may not only release load from the orchestrator, but may also reduce monitoring traffic between the R-PHYs and the orchestrator.

A database (DB), consistent with embodiments of the disclosure, may keep a most up-to-date state of the system that may include states of each pCMTS and cCMTS instance. All the pCMTS and cCMTS instances may be synchronized with the DB to push the latest states into the DB. In addition, there may be at least two subnets in the system: one may be for data paths between the R-PHYs and the cCMTS/pCMTS instance, and the other may be for the data synchronizing between the cCMTS/pCMTS instances and the DB.

FIG. 1 is a block diagram of a system 100 for providing elastic capacity management of remote physical layer (R-PHY) nodes with a cloud Cable Modem Termination System (cCMTS). As shown in FIG. 1, system 100 may comprise an orchestrator 102, a pCMTS 104, a database 106, a plurality of nodes 108, a plurality of devices 110, and a data center 112. Plurality of nodes 108 may comprise a first node 114, a second node 116, and a third node 118. Plurality of nodes 108 may comprise R-PHY nodes where the physical layer (i.e., PHY) of a conventional cable headend CMTS may be shifted to fiber nodes (e.g., RPHY nodes) in a network comprising plurality of nodes 108.

Plurality of devices 110 may comprise a first plurality of devices 120, a second plurality of devices 122, and a third plurality of devices 124. Ones of first plurality of devices 120, second plurality of devices 122, and third plurality of devices 124 may comprise, but are not limited to, a cable modem, a cellular base station, a tablet device, a mobile device, a smart phone, a telephone, a remote control device, a set-top box, a digital video recorder, a personal computer, a network computer, a mainframe, a router, or other similar microcomputer-based device. As shown in FIG. 1, first plurality of devices 120 may be connected to and served by first node 114, second plurality of devices 122 may be connected to and served by second node 116, and third plurality of devices 124 may be connected to and served by third node 118.

Data center 112 may comprise a control device 126 and a server cluster 128. Server cluster 128 may include a cCMTS instance 130. cCMTS instance 130 may include a plurality of Virtual Network Function (VNF) containers. The plurality of VNF containers may comprise, but are not limited to, a first Virtual Network Function (VNF) container 132, a second VNF container 134, a third VNF container 136, and a fourth VNF container 138. Plurality of VNF containers may comprise any number of VNF containers and is not limited to the aforementioned. The plurality of VNF containers may each comprise software modules that when taken as a whole may provide the functionality of the cCMTS instantiated in data center 112. The plurality of VNF containers may reside on the same server (i.e., service cluster 128) or may reside on different servers or in different data centers. Control device 126 may comprise a software-defined networking (SDN) controller. As such, control device 126 may be embodied in hardware and/or in software (including firmware, resident software, micro-code, etc.) and is not limited to being a hardware device.

Figure 2:
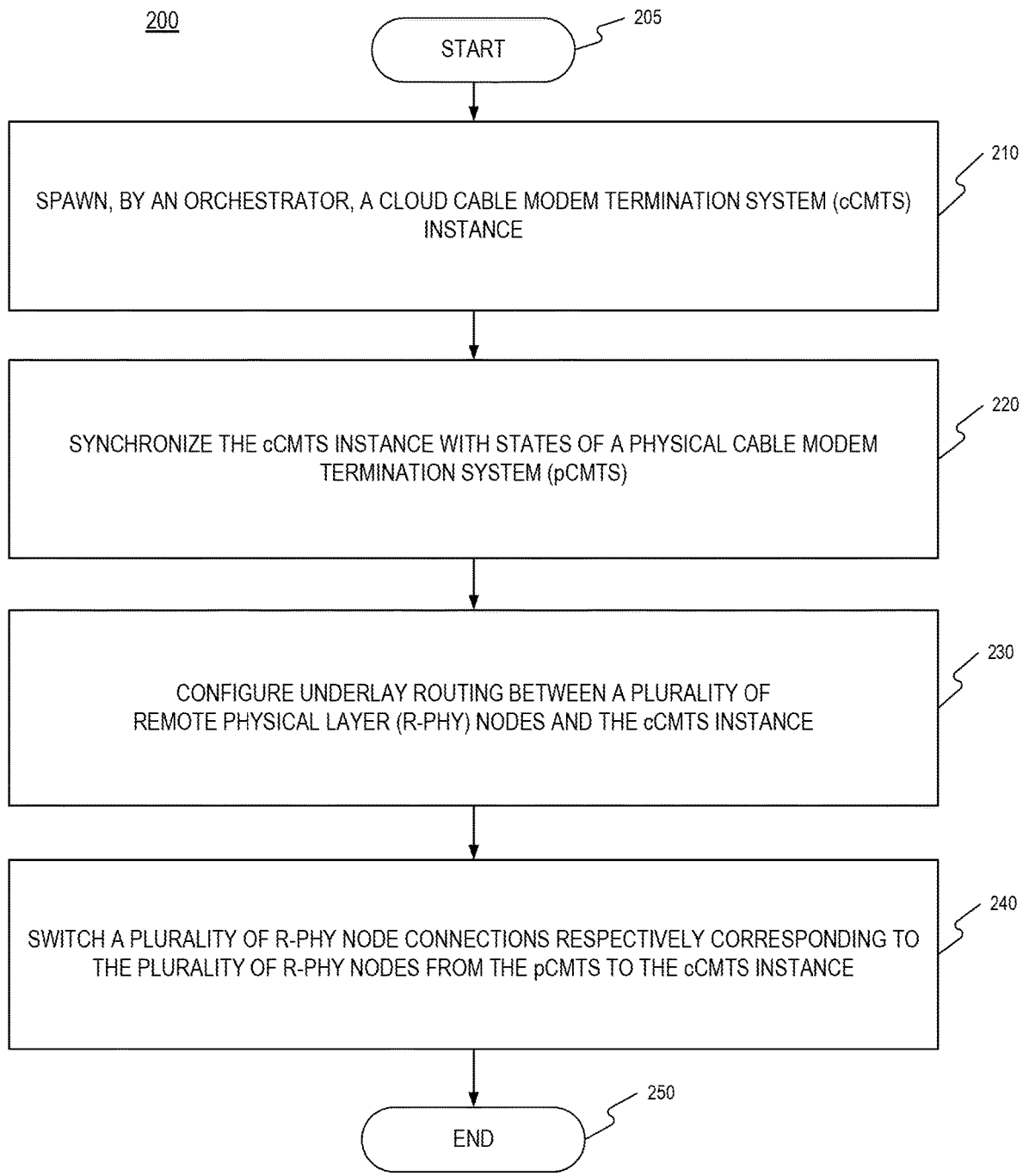
FIG. 2 is a flow chart of a method for providing elastic capacity management of R-PHY nodes with a cCMTS.

FIG. 2 is a flow chart setting forth the general stages involved in a method 200 consistent with embodiments of the disclosure for providing elastic capacity management of R-PHY nodes with a cCMTS. Method 200 may be implemented using orchestrator 102 as described in more detail above with respect to FIG. 1. A computing device 300 as described in more detail below with respect to FIG. 3 may comprise an operating environment for orchestrator 102. Ways to implement the stages of method 200 will be described in greater detail below.

Method 200 may begin at starting block 205 and proceed to stage 210 where orchestrator 102 may spawn cCMTS instance 130. For example, plurality of nodes 108 may sense traffic bandwidth utilization changes at an edge of a cable (e.g., HFC) network and make a local decision on when resource expansion may be needed. To facilitate this process, orchestrator 102 may send a rule based input to plurality of nodes 108 to help with local decision making. For example, when traffic utilization exceeds a predetermined threshold (e.g., 80%) or when the traffic utilization growth speed exceeds a certain rate, the rules may indicate that a resource expansion may be needed.

The rule based input sent from orchestrator 102 to plurality of nodes 108 may be obtained using rules entered by a system administrators based on human experience and judgement for example. In addition, rule based input sent from orchestrator 102 to plurality of nodes 108 may be obtained using a machine learning data model using historical data to generate the rules. When training the machine learning data model, feature sets may include, but are not limited to: i) historical data of traffic bandwidth utilization upon subscriber traffic jam incident reports; ii) a relation between the traffic utilization growth rate and the traffic jam incident reports; and iii) a capacity expansion process duration. Such rules may be dynamically changed and modified by orchestrator 102 based, for example, on other external data obtained by orchestrator 102, such as plurality of nodes 108 neighborhood population expansion trend, new city planning activities, and public events related to the service usage such as large sporting events (e.g., the Super Bowl).

At least one of plurality of nodes 108 may send, to orchestrator 102, a signal to request resource capacity expansion. Upon receiving such a request from the at least one of plurality of nodes 108, orchestrator 102 may make a decision to start the resource allocation change process (e.g., a capacity expansion process) based on, for example, the global resource allocation status and strategies.

Consistent with embodiments of the disclosure, the spawned cCMTS instance 130 may contain a set of microservices and containers with CMTS (i.e., CCAP) core resources based on, for example, new requirement generated from the most recent traffic status on plurality of nodes 108. In cCMTS ecosystems, spawning new cCMTS instances may leverage container orchestration tools for automating deployment, scaling, and management of containerized applications. Such container orchestration tools may provide a platform for automating deployment, scaling, and operations of application containers across clusters of hosts. For example, orchestrator 102 may call container orchestration tools to instantiate a set of microservices and containers to form cCMTS instance 130 with larger capacity. Orchestrator 102 may also configure cCMTS instance 130 including network connections among the plurality of VNF containers in cCMTS instance 130 as well as the external facing network connections. Control device 126 may be used together with orchestrator 102 for network configuration and preparation.

From stage 210, where orchestrator 102 spawns cCMTS instance 130, method 200 may advance to stage 220 where orchestrator 102 may synchronize cCMTS instance 130 with states of pCMTS 104. For example, cCMTS instance 130 may synchronize from database 106 to obtain the same states of pCMTS 104. At this point, database 106 synchronizing may use a separate subnet from the data path between plurality of nodes 108 and the pCMTS 104 data path. Consistent with embodiments of the disclosure, an Ethernet interface on cCMTS instance 130 data path may be turned off (e.g., shutdown). By doing so, during database 106 synchronizing between pCMTS 104 and cCMTS instance 130, which may be a preparation phase of cCMTS instance 130, traffic between plurality of nodes 108 and pCMTS 104 may keep flowing.

Once orchestrator 102 synchronizes cCMTS instance 130 with states of pCMTS 104 in stage 220, method 200 may continue to stage 230 where orchestrator 102 may configure underlay routing between a plurality of remote physical layer (R-PHY) nodes (i.e., plurality of nodes 108) and cCMTS instance 130. For example, orchestrator 102 may work with control device 126 to configure underlay routing between plurality of nodes 108 and cCMTS 130 so that when overlay tunnel (e.g., L2TPv3) is switched over to cCMTS 130, the routing path may be ready for data sent from plurality of nodes 108 to cCMTS 130. Consistent with embodiments of the disclosure, cCMTS instance 130 may be spawned on an arbitrary compute node where the underlay fabric in data center 112 may not have a routing path from plurality of nodes 108 to cCMTS instance 130.

Based on different routing protocols turned on in data center 112, such as OpenFlow, BGP, OSPF, VLAN/VXLAN, or Segment Routing, orchestrator 102 may configure underlay switches/routers accordingly to allow the traffic flow from plurality of nodes 108 to cCMTS instance 130. Consistent with embodiments of the disclosure, cCMTS instance 130 may be created within data center 112 where orchestrator 102 may program the fabric for the underlay routing paths.

After orchestrator 102 configures the underlay routing between the plurality of R-PHY nodes (i.e., plurality of nodes 108) and cCMTS instance 130 in stage 230, method 200 may proceed to stage 240 where orchestrator 102 may switch a plurality of R-PHY node connections respectively corresponding to the plurality of R-PHY nodes (i.e., plurality of nodes 108) from pCMTS 104 to cCMTS instance 130. For example, orchestrator 102 may turn off data path Ethernet interface on pCMTS 104 and then turn on data path Ethernet to interface cCMTS 130. Since the Internet Protocol (IP) address of cCMTS instance 130 and pCMTS 104 may be the same, data being sent from plurality of nodes 108 may continuously flow to cCMTS instance 130. Because before the switch over, both database 106 synchronizing and the underlay routing orchestration may have been completed, the time for the switching over may have been done within a couple of seconds. Accordingly, a cable modem connected, for example, to one of plurality of nodes 108 may be kept online and no subscriber traffic may be affected. Once orchestrator 102 switches the plurality of R-PHY node connections respectively corresponding to the plurality of R-PHY nodes (i.e., plurality of nodes 108) from pCMTS 104 to cCMTS instance 130 in stage 240, method 200 may then end at stage 250.

Consistent with embodiments of the disclosure, existing connections from plurality of nodes 108 to pCMTS 104 may be kept while augmenting the resources from cCMTS instance 130 to gain an overall expansion of the CCAP core resources. There may be various solutions to implement the augmentation of the resources from cCMTS instance 130 to pCMTS 104. For example, orchestrator 102 may assign a new IP address to cCMTS instance 130 and may orchestrate the underlay routing for the underlay connectivity between plurality of nodes 108 and cCMTS 104.

Orchestrator 102 may leverage cloud native solutions and tools (e.g., as described above) to automatically assign an IP address to the new instances spawned in the cloud. For example, orchestrator 102 may work with control device 126 to configure the underlay routing between plurality of nodes 108 and cCMTS 130 so that the routing path may be ready for data sent from plurality of nodes 108 to cCMTS 130. Then orchestrator 102 may switch some of the subscriber traffic to cCMTS instance 130.

Consistent with embodiments of the disclosure, logic may be implemented in plurality of nodes 108 to send some of the subscriber traffic to pCMTS 104 and the remaining subscriber traffic to cCMTS instance 130. Plurality of nodes 108 configuration on both pCMTS 104 and cCMTS instance 103 may be properly executed so that both pCMTS 104 and cCMTS instance 130 may serve the traffic from plurality of nodes 108.

Figure 3:
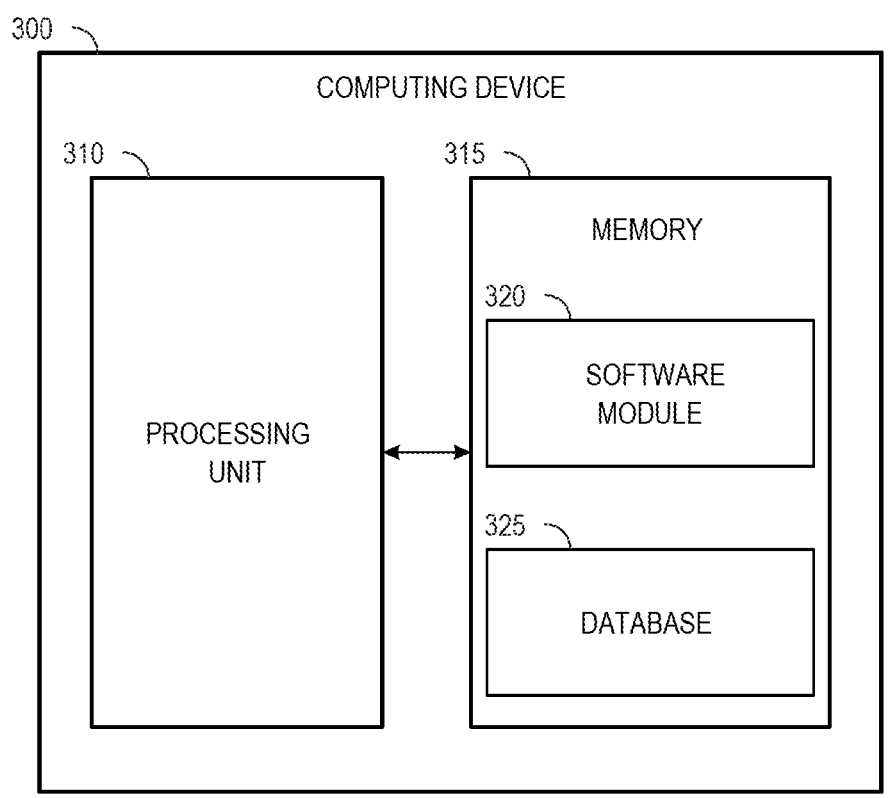
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing elastic capacity management of R-PHY nodes with a cCMTS, including for example, any one or more of the stages from method 200 described above with respect to FIG. 2. Computing device 300, for example, may provide an operating environment for orchestrator 102, pCMTS 104, control device 126, or server cluster 128. Orchestrator 102, pCMTS 104, control device 126, or server cluster 128 may operate in other environments and are not limited to computing device 300.

Computing device 300 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising: receiving, by an orchestrator, a request for resource capacity expansion from at least one of the plurality of R-PHY nodes; spawning, by the orchestrator, a cloud Cable Modem Termination System (cCMTS) instance; synchronizing the cCMTS instance with states of a physical Cable Modem Termination System (pCMTS), wherein synchronizing the cCMTS instance comprises: synchronizing the cCMTS instance from a database on a second data path different from a first data path between a plurality of remote physical layer (R-PHY) nodes and the pCMTS, wherein the cCMTS instance comprises a first cCMTS subnet and a second cCMTS subnet, wherein the first CCMTS subnet forms the second data path between the database and the cCMTS, wherein the second cCMTS subnet forms a third data path between the cCMTS instance and the plurality of R-PHY nodes, wherein the pCMTS comprises a first pCMTS subnet and a second pCMTS subnet, wherein the first pCMTS subnet forms a fourth data path between the database and the pCMTS, wherein the second pCMTS subnet forms the first data path between the pCMTS and the plurality of R-PHY nodes, and wherein the pCTMS sends the states to the database on the fourth data path, and shutting down the third data path between the plurality of remote physical layer (R-PHY) nodes and the cCMTS instance; configuring underlay routing between the plurality of R-PHY nodes and the cCMTS instance; and switching on the third data path comprising a plurality of R-PHY node connections respectively corresponding to the plurality of R-PHY nodes from the pCMTS to the cCMTS instance.

2. The method of claim 1, further comprising creating, by the at least one of the plurality of R-PHY nodes, the request for resource capacity expansion based on rules provided to the at least one of the plurality of R-PHY nodes from the orchestrator.

3. The method of claim 1, wherein spawning the cCMTS instance comprises spawning the cCMTS instance based upon the received request for resource capacity expansion.

4. The method of claim 1, wherein spawning the cCMTS instance comprises spawning the cCMTS instance that comprises a set of microservices and containers with Cable Modem Termination System core resources based on new requirements generated from traffic status on the plurality of R-PHY nodes.

5. The method of claim 1, wherein synchronizing the cCMTS instance comprises using a separate subnet from the first data path between the plurality of R-PHY nodes and the pCMTS.

6. The method of claim 1, wherein configuring the underlay routing between the plurality of remote physical layer (R-PHY) nodes and the cCMTS instance comprises configuring the underlay routing between the plurality of remote physical layer (R-PHY) nodes and the cCMTS instance wherein an Internet Protocol (IP) address of the cCMTS instance is the same as an IP address of the pCMTS.

7. A system comprising: a memory storage; and a processing unit coupled to the memory storage, wherein the processing unit is operative to: receive a request for resource capacity expansion from at least one of the plurality of R-PHY nodes; spawn a cloud Cable Modem Termination System (cCMTS) instance; synchronize the cCMTS instance with states of a physical Cable Modem Termination System (pCMTS) obtained from a database, wherein the processing unit being operative to synchronize the cCMTS instance comprises the processing unit being operative to: synchronize the cCMTS instance on a second data path different from a first data path between a plurality of remote physical layer (R-PHY) nodes and the pCMTS, wherein the cCMTS instance comprises a first cCMTS subnet and a second cCMTS subnet, wherein the first CCMTS subnet forms the second data path between the database and the cCMTS, wherein the second cCMTS subnet forms a third data path between the cCMTS instance and the plurality of R-PHY nodes, wherein the pCMTS comprises a first pCMTS subnet and a second pCMTS subnet, wherein the first pCMTS subnet forms a fourth data path between the database and the pCMTS, wherein the second pCMTS subnet forms the first data path between the pCMTS and the plurality of R-PHY nodes, and wherein the pCTMS sends the states to the database on the fourth data path, and shut down the third data path between the plurality of R-PHY nodes and the cCMTS instance; configure underlay routing between a plurality of R-PHY nodes and the cCMTS instance; and switch on the third data path comprising a portion of a plurality of R-PHY node connections respectively corresponding to a portion of the plurality of R- PHY nodes from the pCMTS to the cCMTS instance.

8. The system of claim 7, wherein the processing unit being operative to spawn the cCMTS instance comprises the processing unit being operative to spawn the cCMTS instance based upon the received request for resource capacity expansion.

9. The system of claim 7, wherein the cCMTS instance comprises a set of microservices and containers with Cable Modem Termination System core resources based on new requirements generated from traffic status on the plurality of R-PHY nodes.

10. The system of claim 7, wherein the processing unit being operative to synchronize the cCMTS instance comprises the processing unit being operative to use a separate subnet from the first data path between the plurality of R-PHY nodes and the pCMTS.

11. The system of claim 7, wherein an Internet Protocol (IP) address of the cCMTS instance is different than the IP address of the pCMTS.

12. A non-transitory computer-readable medium that stores a set of instructions which when executed perform a method executed by the set of instructions comprising: receiving a request for resource capacity expansion from at least one of the plurality of R-PHY nodes; spawning a cloud Cable Modem Termination System (cCMTS) instance; synchronizing the cCMTS instance with states of a physical Cable Modem Termination System (pCMTS) obtained from a database, wherein synchronizing the cCMTS instance comprises: synchronizing the cCMTS instance on a second data path different from a first data path between a plurality of remote physical layer (R-PHY) nodes and the pCMTS, wherein the cCMTS instance comprises a first cCMTS subnet and a second cCMTS subnet, wherein the first CCMTS subnet forms the second data path between the database and the cCMTS, wherein the second cCMTS subnet forms a third data path between the cCMTS instance and the plurality of R-PHY nodes, wherein the pCMTS comprises a first pCMTS subnet and a second pCMTS subnet, wherein the first pCMTS subnet forms a fourth data path between the database and the pCMTS, wherein the second pCMTS subnet forms the first data path between the pCMTS and the plurality of R-PHY nodes, and wherein the pCMTS sends the states to the database on the fourth data path, and shutting down the third data path between the plurality of R-PHY nodes and the cCMTS instance; configuring underlay routing between the plurality of R-PHY nodes and the cCMTS instance; and switching on the third data path comprising a plurality of R-PHY node connections respectively corresponding to the plurality of R-PHY nodes from the pCMTS to the cCMTS instance.

13. The non-transitory computer-readable medium of claim 12, wherein the request for resource capacity expansion is created by the at least one of the plurality of R-PHY nodes based on rules provided to the at least one of the plurality of R-PHY nodes from an orchestrator.

14. The non-transitory computer-readable medium of claim 12, wherein spawning the cCMTS instance comprises spawning the cCMTS instance based upon the received request for resource capacity expansion.

15. The non-transitory computer-readable medium of claim 12, wherein spawning the cCMTS instance comprises spawning the cCMTS instance that comprises a set of microservices and containers with Cable Modem Termination System core resources based on new requirements generated from traffic status on the plurality of R-PHY nodes.

16. The non-transitory computer-readable medium of claim 12, wherein synchronizing the cCMTS instance comprises using a separate subnet from the first data path between the plurality of R-PHY nodes and the pCMTS.

17. The non-transitory computer-readable medium of claim 12, wherein configuring the underlay routing between the plurality of remote physical layer (R-PHY) nodes and the cCMTS instance comprises configuring the underlay routing between the plurality of remote physical layer (R-PHY) nodes and the cCMTS instance wherein an Internet Protocol (IP) address of the cCMTS instance is the same as an IP address of the pCMTS.

\* \* \* \* \*